United States Patent Office 3,577,450
Patented May 4, 1971

3,577,450
PROCESS FOR PREPARING METHYLENE
BIS-(ALUMINUM DIHALIDES)
Morris R. Ort, Seabrook, Tex., and Edward H. Mottus, Ballwin, Mo., assignors to Monsanto Company, St. Louis, Mo.
No Drawing. Filed Dec. 23, 1968, Ser. No. 786,449
Int. Cl. C07f 5/06
U.S. Cl. 260—448         3 Claims

ABSTRACT OF THE DISCLOSURE

Aluminum, a methylene dihalide and the corresponding halogen are reacted to form a methylene bis-(aluminum dihalide) and there may be some by-product formed, which will contain an aluminum atom having only a single halogen atom attached. For example, when chlorine, methylene dichloride and aluminum are reacted, the following compounds are formed:

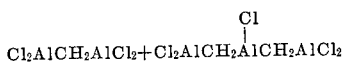

It is preferred that the halogen and aluminum be reacted in a ratio of about 1:1 on a gram-atom basis for optimum yields of the bis-aluminum compound, and it is preferred to use high purity aluminum, that all reactants be substantially moisture-free and the reaction be carried out in an inert atmosphere. It is preferred to carry the reaction out in the dark to inhibit the halogenation of the methylene dihalide, especially chlorination.

---

This invention relates to a process for making methylene bis-(aluminum dihalide) compounds.

In copending application Ser. No. 669,306, filed Sept. 20, 1967, now U.S. Pat. No. 3,509,189 is disclosed a process for making compounds such as $Cl_2AlCH_2AlCl_2$. The present invention is another process for making

and will also make the bromide, iodine and fluorine analogs.

The process of this invention involves reacting aluminum, a methylene dihalide, and the corresponding halogen to make a methylene bis-(aluminum dihalide), and under certain reaction conditions some by-product having an aluminum atom with a single halogen attached will be formed. Preferred conditions are an inert atmosphere blanketing the reaction, high purity aluminum and other reactants and substantially no moisture in reactants. Also, it is preferred to use about 1 gram-atom of halogen per gram-atom of aluminum. An excess of the methylene dihalide can be used as a reaction medium or an inert solvent can be used as a reaction medium. It is preferred to carry the reaction out in the dark to inhibit halogenation of the methylene dihalide, especially to inhibit chlorination of methylene dichloride. Pressure can be used to contain volatile reactants, if desired.

It is believed that for making the primary products the reaction proceeds in the following fashion as exemplified by the making of the chloro compound:

However, the reaction may proceed differently and in any event it is not intended to be bound by this theory. Also, mixtures of halogens can be used to obtain a mixture of methylene bis-(aluminum dihalides) and/or such compounds with different halogen atoms on the same molecule.

For the highest yields of desired products, high purity aluminum of the order of 99.9% or higher purity is desirable; however, the process is operable with relatively impure aluminum.

In many instances the reaction will proceed at room temperature or less; however, either higher or lower temperatures may be desirable depending on the particular reactants used. It is preferred to carry out the reaction in a solvent and an excess of the organic halogen compound can be used or an inert organic solvent such as hexane, benzene or the like can be used.

The products made by the process of the invention are useful as polymerization catalysts components as indicated by copending application Ser. No. 621,036, filed Mar. 6, 1967.

The invention will be more clearly understood from the following detailed description of specific examples thereof.

EXAMPLE 1

This example describes the preparation of methylene bis-(aluminum dichloride). A 100 ml. round bottom flask was taped on the outside with black tape to exclude light, equipped with a thermometer magnetic stirrer and three-way stopcock and was dried in an oven and cooled under nitrogen. To the flask was charged 75 ml. of dichloromethane which had been dried using molecular sieves. Chlorine gas was bubbled into the flask in a slow stream for fifteen minutes. Weighing the flask before and after the chlorine addition, it was determined that 1.1 g. (0.032 g. atom) of chlorine had been added. The purpose of taping the flask with black tape was to discourage light catalyzed chlorination of the methylene dichloride. Then to the reaction flask was added 0.9236 g. 0.34 g. atom) of 99.99% pure aluminum cut into about ⅛" squares. The reaction flask was blanketed with nitrogen and stirred. Water bath cooling with ice added as needed was used to keep the temperature of the reaction down and the highest recorded temperature during the early minutes of the reaction was 38° after which time the reaction was carried out at about room temperature. After two days of stirring all of the aluminum had not reacted; however, the experiment was then terminated. To the reaction mixture was added 10 ml. of ethyl ether and the excess ether and methylene dichloride were removed by distillation heating with a water bath. The last traces of volatile material were removed under 0.1–0.2 mm. of mercury vacuum over a period of two hours. The residue was a dark viscous oil and a sample of this product was taken, diluted with an equal amount of methylene dichloride and the nuclear magnetic resonance (NMR) spectra obtained. Two peaks were observed in the NMR testing, one at 10.53τ and the other at 11.18τ. The peak at 10.53τ corresponds to the compound

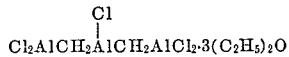

and the peak at 11.18τ corresponds to the compound $Cl_2AlCH_2AlCl_2 \cdot 2(C_2H_5)_2O$. The remaining product was decomposed with methanol to recover unreacted aluminum. The unreacted aluminum was washed with methanol, water, methanol, methylene dichloride and acetone. The aluminum was dried in an oven and weighed 0.3437 g. indicating that 0.5799 g. of aluminum had reacted, or 0.0215 g. atom of aluminum had reacted.

Actually, a preferred method of carrying out the reaction of this example is in an analogous way to Example 2 whereby a solution of chlorine in dichloromethane is added dropwise to a slurry of aluminum in dichloromethane.

Furthermore, it should be noted that aluminum does not react with dichloromethane under standard conditions in the absence of an initiator such as chlorine, hydrogen chloride (see U.S. Pat. 3,509,190 issued Apr. 28, 1970) or a bromine compound such as suggested in U.S. Pat. 3,509,189 issued Apr. 28, 1970.

EXAMPLE 2

This example describes the preparation of methylene bis-(aluminum dibromide). This experiment was carried out in a similar manner to Example 1 except that the reaction flask was not wrapped with black tape to exclude light. To the reaction flask was charged 1.6327 g. (0.0605 g. atoms) of aluminum and 25 ml. of dibromomethane. The reaction mixture was stirred and blanketed with nitrogen. Then from a funnel 25 ml. of methylene dibromide containing 1.55 ml., 4.84 g. (0.0605 g. atoms) of bromine was added, drop by drop, over a period of one hour and twenty minutes to the aluminum and methylene dibromide in the flask. The reaction was started at room temperature and cooling with an ice water bath was used to keep the temperature down, and in fact, for the last one hour and fifteen minutes of bromine addition, the temperature was maintained at 10–15° C. When all the methylene dibromide containing bromine had been added, the reaction mixture was allowed to warm to room temperature and was stirred overnight. All of the aluminum had reacted. The product methylene bis-(aluminum dibromide) dissolved in methylene dibromide is suitable as is for use as a polymerization catalyst component as indicated in the general teachings of this application and the same would have been true of the reaction mixture product of Example 1.

If instead of bromine and methylene dibromide of Example 2, there were used the same number of g. atoms amounts of iodine and methylene diiodide, the product would be methylene bis-(aluminum diiodide); and, if instead of the bromine and methylene dibromide there were used the same number of g. atoms of fluorine and methylene difluoride the product would be methylene bis-(aluminum difluoride). Because of the corrosiveness of fluoride, special equipment well known to those in the art for handling fluorine would be desirable to carry out this reaction, especially if any hydrogen fluoride were formed.

Although the invention has been described in terms of specified examples which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for making a methylene bis-(aluminum dihalide) comprising reacting a methylene dihalide, the corresponding halogen and aluminum, the ratio of said halogen to aluminum being about 1:1 on a gram-atom basis, under substantially anhydrous conditions, said reaction being carried out in an inert atmosphere.

2. The process of claim 1 wherein said methylene bis-(aluminum dihalide) is $Cl_2AlCH_2AlCl_2$, said methylene dihalide is methylene dichloride, said halogen is chlorine, and the reaction is carried out in the dark.

3. The process of claim 1 wherein said methylene bis-(aluminum dihalide) is methylene bis-(aluminum dibromide), said methylene dihalide is methylene bromide, said halogen is bromine and the reaction is carried out in the dark.

References Cited

UNITED STATES PATENTS

| 3,109,838 | 11/1963 | Chatt et al. | 260—448AX |
| 3,509,189 | 4/1970 | Ort et al. | |
| 3,509,190 | 4/1970 | Ort et al. | |

OTHER REFERENCES

Chemical Abstracts, vol. 64, p. 19820 (1966).

TOBIAS E. LEVOW, Primary Examiner

H. M. S. SNEED, Assistant Examiner